(12) United States Patent
Kovac et al.

(10) Patent No.: US 12,088,699 B2
(45) Date of Patent: Sep. 10, 2024

(54) SECURE DEVICE PAIRING

(71) Applicant: NCR Voyix Corporation, Atlanta, GA (US)

(72) Inventors: Michal Kovac, Prague (CZ); Jiří Hanika, Prague (CZ); Michal Jirous, Prague (CZ); Dominik Skoda, Prague (CZ)

(73) Assignee: NCR Voyix Corporation, Atlanta, GA (US)

( * ) Notice: Subject to any disclaimer, the term of this patent is extended or adjusted under 35 U.S.C. 154(b) by 202 days.

(21) Appl. No.: 17/855,044

(22) Filed: Jun. 30, 2022

(65) Prior Publication Data
US 2024/0007272 A1    Jan. 4, 2024

(51) Int. Cl.
| | | |
|---|---|---|
| H04L 9/00 | (2022.01) | |
| H04L 9/08 | (2006.01) | |
| H04L 9/32 | (2006.01) | |
| H04L 29/06 | (2006.01) | |

(52) U.S. Cl.
CPC ............ H04L 9/083 (2013.01); H04L 9/0838 (2013.01); H04L 9/3263 (2013.01)

(58) Field of Classification Search
CPC ...... H04L 9/083; H04L 9/0838; H04L 9/3263
USPC ........................................................ 380/277
See application file for complete search history.

(56) References Cited

U.S. PATENT DOCUMENTS

| | | | |
|---|---|---|---|
| 8,676,123 B1 * | 3/2014 | Hinkle | G10L 19/00 455/414.1 |
| 10,528,709 B1 * | 1/2020 | Shekhtman | H04N 21/4334 |
| 10,798,184 B2 * | 10/2020 | Henning | H04L 67/025 |
| 2009/0158244 A1 * | 6/2009 | Foumani | G06F 8/74 717/105 |
| 2011/0092161 A1 * | 4/2011 | Dotan | H04B 17/27 340/572.1 |
| 2013/0132854 A1 * | 5/2013 | Raleigh | G06F 3/0482 715/738 |
| 2013/0139218 A1 * | 5/2013 | Roulland | H04L 63/062 726/3 |
| 2015/0234516 A1 * | 8/2015 | Frojdh | G06F 3/041 345/173 |
| 2016/0277383 A1 * | 9/2016 | Guyomarc'h | H04L 63/0853 |
| 2017/0048951 A1 * | 2/2017 | Huang | H05B 45/20 |
| 2017/0201850 A1 * | 7/2017 | Raleigh | H04W 4/50 |

(Continued)

*Primary Examiner* — Haresh N Patel
(74) *Attorney, Agent, or Firm* — Schwegman Lundberg & Woessner, P.A.

(57) ABSTRACT

During pairing between a connecting device and a server, cryptographic information of the connecting device is mapped to symbols and displayed, in a random sequence, on the connecting device. An operator, who is authorizing the connecting device to establish a trusted connection to the server, is provided the symbols in a different sequence from the random sequence. The operator is asked to put the symbols into the random sequence, a candidate validation code is generated from the operator-provided sequence and confirmed by the connecting device when an actual validation code generated by the connecting device for the random sequence matches the candidate validation code. The entropy/effort entered by operator is smaller than entropy of the underlying cryptographic information, but the full extent of the underlying cryptographic information is reliably verified by the operator action.

20 Claims, 5 Drawing Sheets

(56) References Cited

U.S. PATENT DOCUMENTS

| | | | |
|---|---|---|---|
| 2018/0013815 A1* | 1/2018 | Gold | H04L 63/00 |
| 2019/0297134 A1* | 9/2019 | Gold | G06F 3/0481 |
| 2020/0084511 A1* | 3/2020 | Kasarabada | H04L 67/51 |
| 2024/0005713 A1* | 1/2024 | Axtolis | H04W 12/50 |

* cited by examiner

SECURE DEVICE PAIRING

BACKGROUND

Network connectivity is omnipresent with the advent of wireless technologies. In fact, even the smallest of devices, which are not typically thought to be "intelligent," now include wireless connectivity capabilities that allow such devices to become part of the Internet-of-Things (IoTs).

The problem for retailers when connecting a new device to their server for a first time is that trust must be established between the server and the device to ensure that there is no eavesdropper on the connection (referred to as a Man-In-The-Middle (MITM)). An MITM attacker simultaneously acts as a fake server to the device being connected and as the new connecting device to the retailer's actual server. Trust between the device and the server can be established using digital certificates (representing shared secrets between the device and the server).

An established standard for verifying trust is manual comparison, by an authorized operator, of a certificate displayed on the connecting device to a certificate displayed on a display associated with the server. If the certificates match, it can be assumed that there is no MITM attacker present. The shared certificate displayed on the device may be presented in a format referred to as a fingerprint. A fingerprint may include a series of bytes, where each byte is represented using two hexadecimal digits. For example, a fingerprint F may be displayed on the device as "0c be 8e 93 85 a2 8a ce 18 61 19 7c 43 cc 70 26 1d 60 b4 78." This standard approach for verifying trust between a connecting device and a server suffers from various drawbacks, technical solutions to which are disclosed herein.

SUMMARY

Embodiments of the disclosed technology relate to, among other things, systems, methods, and computer-readable media for secure device pairing. According to an aspect of the disclosed technology, secure device pairing includes initiation of session linking between a server and a connecting device over a network. A set of symbols is presented to an operator of an operator device. The set of symbols can include alphanumeric characters, words, tokens, or any other suitable indicia. The set of symbols is presented to the operator in a different order from an original sequence of the symbols currently being presented on a display of the connecting device. The disordered set of symbols is presented as a challenge to the operator. A reordering of the disordered set of symbols—which the operator believes matches the original symbol sequence displayed on the connecting device—is received from the operator. A candidate validation code for the connecting device is derived from the reordered set of symbols received from the operator. In addition, the connecting device generates an actual validation code based on the original sequence of symbols, and the connecting device is paired to the server during the session linking responsive to determining that the actual validation code matches the candidate validation code.

DETAILED DESCRIPTION

Figure 1:
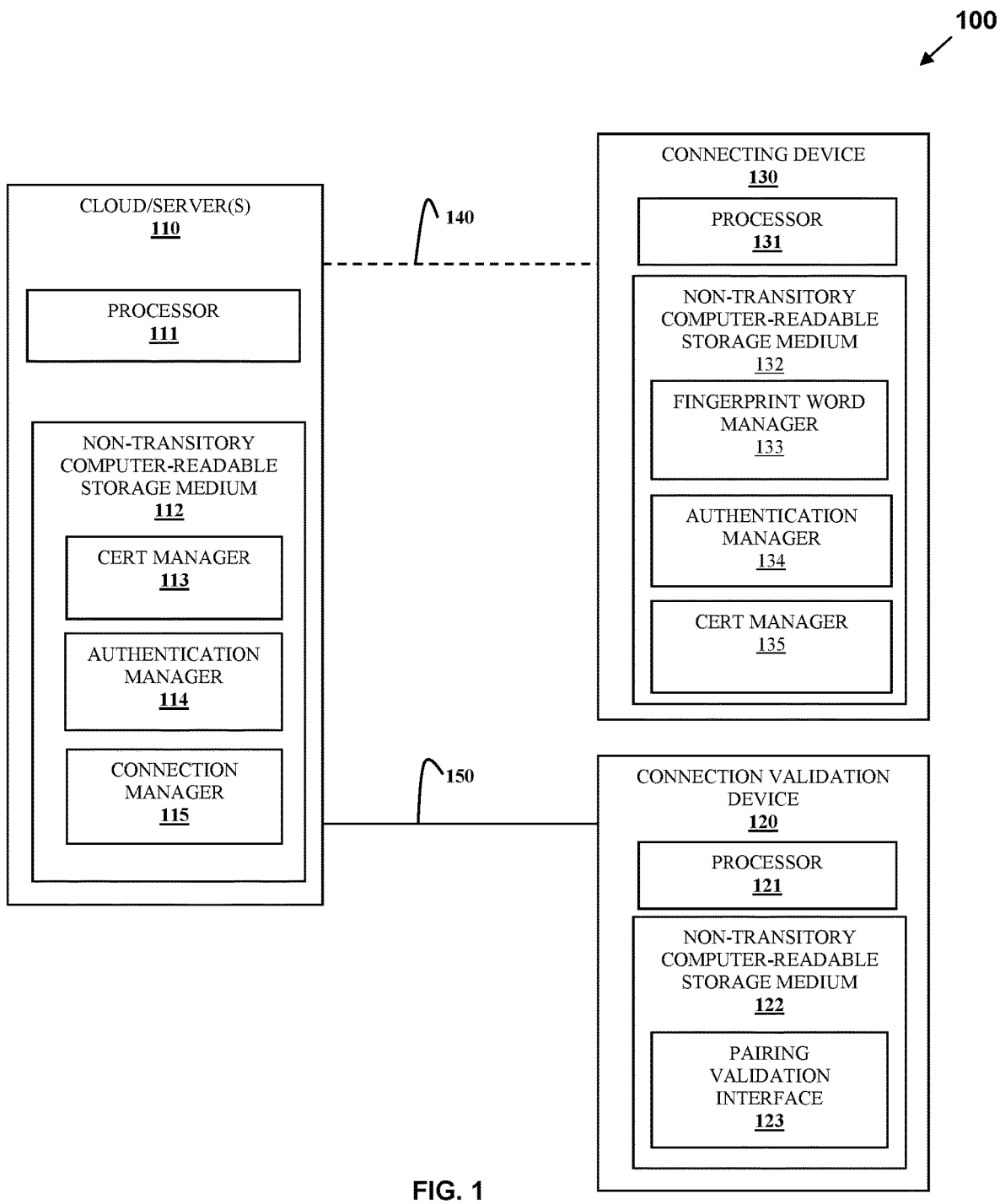
FIG. 1 is a diagram of a system for secure device pairing, according to an example embodiment.

Embodiments of the disclosed technology relate to, among other things, systems, methods, and computer-readable media for secure device pairing. A conventional approach for device pairing involves pairing a connecting device with a server upon determining that certificates presented on respective displays of the connecting device and server match. The certificates may take the form of fingerprints that include strings of hexadecimal digits. A drawback to this standard approach is that it relies on a diligent comparison of long strings of hexadecimal digits. In some cases, operators responsible for frequent pairing operations for a retailer's new devices may begin to compare only a short part of the fingerprint (such as the first few bytes or the last few bytes). In other cases, operators short-circuit the verification process even more by approving the trust pairing of the device to the server based solely on the pairing request arriving from an expected new device at an expected time.

Attackers are able to exploit these types of operator behaviors. For example, in those scenarios in which an operator approves a connection request from a device based solely on the timing of receipt of the request, an attacker can simply passively wait until a new device is being paired/connected to the network (via the server) to initiate an attack. Another example technique employed by attackers is to pre-generate certificates that they control, and then substitute one of these attacker-generated certificates for the device-generated certificate. More specifically, the attacker generates the certificate fingerprint to include a short left-hand side (prefix) and/or right-hand side (suffix) that matches the corresponding prefix and/or suffix of the device-controlled certificate fingerprint, with the expectation that the operator will only check the prefix/suffix portions of the substituted certificate fingerprint and will skip a check of the entire fingerprint.

Another problem with the above-described standard approach to trust validation during device pairing is that it leaves no meaningful forensic trace demonstrating the degree to which the credential (fingerprint) was actually checked by the operator. This means that authorized operators can collude with attackers and permit pairing of an unauthorized device (e.g., a MITM device) during a very brief period of time when an authorized device is being paired. This can translate into a long lasting MITM attack on the network. The authorized operator can easily repudiate any collusion allegation because the pairing session transcript does not link the operator to the unauthorized device (i.e., the additional device inserted between the connecting authorized device).

Example embodiments of the disclosed technology provide a technical solution to the above-described security vulnerabilities that can occur during device pairing as a result of rogue/negligent operator behavior and/or attacks. In particular, example embodiments of the disclosed technology strike a user interface tradeoff that allows for easy execution of a legitimate device pairing operation, while also ensuring resilience to attacks and operator errors. Instead of an authorizing individual having to confirm that two long hexadecimal pairs arranged in a string match what is being displayed both on the connecting device's display and an authorizing server's display, the individual is presented with easy-to-understand and recognizable symbols. Further, the individual is challenged because the order of the symbols presented on the connecting device's display does not match the order of the symbols presented on the server's display. In fact, the server is unaware of the order of the symbols being presented on the connecting device's display. Rather than confirming a comparison (as is the case in a conventional scenario), the individual has to put the server symbols into the connecting device's displayed order; otherwise pairing will fail. This means there is little to no chance a MITM device can be present because the MITM device would need to make the symbols match the order presented on the connecting device; but the order of the symbols displayed on the connecting device is never transmitted over any network and the server is unaware of the order. As a result, in the event that an MITM device is actually able to present the correct order to the server during the pairing, the authorizing individual is precluded from being able to deny culpability as likely the only way the MITM device was able to provide the correct order to pair with the server was if the individual provided a captured image of the connecting device's display to an operator of the MITM device during the pairing. Thus, the individual cannot reasonably allege that he/she lacked knowledge of the MITM device's unauthorized pairing.

Additionally, during a conventional pairing operation, after an individual confirms comparison of the two presented certificates, the individual is presented with a validation code provided by the connecting device (displayed on the connecting device). This validation code has to be provided to the server by the individual. In contrast, in accordance with the techniques presented herein, the validation code is independently generated by the server from the entered order of the symbols provided by the individual. This means that the connecting device never displays or communicates the true validation code over any network link. Rather, the server generates a candidate validation code from the individual's entered order of the symbols and provides that candidate validation code to the connecting device for comparison against the true validation code (computed by the connecting device from the displayed order of the symbols presented on the connecting device's display).

FIG. 1 is a diagram of a system 100 for secure device pairing between two devices, according to an example embodiment. It is to be noted that the components are shown schematically in greatly simplified form, with only those components relevant to understanding of the embodiments being illustrated. Furthermore, the various components (that are identified in the FIG. 1), and the arrangement of the components is presented for purposes of illustration only. It is to be noted that other arrangements with more or fewer components are possible without departing from the teachings of secure device pairing between two devices, presented herein and below.

As will be demonstrated herein, system 100 provides techniques for securely establishing trust between a new device that is being connected to a network and a server over a secure connection. Trust refers to the new device and the server each possessing secrets that can be independently cryptographically verified for authenticating to one another and then communicating with one another after authentication using a secure encryption protocol (e.g., an encrypted communication line over the network).

System 100 may include a cryptographic application residing/installed on the new (connecting) device and a connection manager residing on the server to provide a fingerprint of the connecting device's independently cryptographically verifiable secret. The fingerprint may be a collection of symbols (e.g., characters, words, tokens, etc.) that can be read and understood by an operator. The set of symbols of the fingerprint may be randomly assembled into a different order by the connecting device. The server connection manager of the server presents an order of the symbols (e.g., random order of the symbols, certificate defined order of the symbols or an alphabetic order of the symbols) on the operator's trusted device as a challenge requesting that the operator put the symbols on the operator's device back into the order that is being displayed by the connecting device. The server connection manager is unaware of the order that is being displayed on the connecting device's display by the connecting device, that order can only be obtained by the operator viewing the connecting device's display. However, the server connection manager is aware of the certificate defined order since the server has the connecting device certificate and is in synchronization with the codec being used by the connecting device to translate the certificate into the set of independent and separate symbols.

The connection manager may calculate a candidate validation code (e.g., a time-based one-time password (TOTP) or a one-time password (OTP)) based on the rearranged symbol order entered by the operator and then send the candidate validation code to the connecting device. The connecting device, in turn, calculates an actual validation code based on the symbol order being displayed on the connecting device, and determines whether the actual validation code matches the candidate validation code supplied by the connection manager. If the validation codes match, the connecting device informs the connection manager, which then determines that there is no MITM device on the connection line and establishes trust between the server and the connecting device. A variety of cryptographic signatures are verified, and certificates are passed between the connecting device and the server during the trust establishing process, as discussed in greater detail herein in connection with various embodiments.

It is noted that Tunnel Setup Protocol (TPS) or Hyper Text Transfer Protocol over Secure Sockets (HTTPS) or any other session linking protocol (secure or non-secure) can be used during the initial session linking between the connecting device and the server. Thus, it should be appreciated that the descriptions that follow are merely illustrative and not exhaustive.

System 100 includes at least one server 110, a connection validation device 120, and a connecting device 130. Server 110 includes a processor and a non-transitory computer-readable storage medium 112. Medium 112 includes a certification manager 113 (hereinafter "cert manager 113"), an authentication manager 114, and a connection manager 115, each of which includes executable instructions, that when executed by processor 111, cause processor 111 to perform respective operations discussed herein and below with respect to 113-115. Medium 112 also stores one or more certificates and signed certificates that are shared with connecting device 130 (such as a signed digital certificate) and which may be unique to the trust relationship between the server and the connecting device. Medium 112 may also include one or more certificates and signed certificates that are shared with connecting device 130, but which are unique to the connecting device 130. Each certificate of server 110 may be unique to a respective corresponding connecting device 130 and may be processed in connection with validating and authenticating the corresponding connecting device 130 for pairing/connection with server 110.

Connection validation device 120 (hereinafter "validation device 120") includes at least one processor 121 and a non-transitory computer-readable storage medium 122. Medium 122 includes executable instructions for a pairing validation interface 124. When the executable instructions are executed by processor 121, processor 121 is caused to perform operations discussed herein and below with respect to pairing validation interface 124.

Each connecting device 130 includes a processor 131 and a non-transitory computer-readable storage medium 132. Medium 132 includes a fingerprint word manager 133, an authentication manager 134, and a certificate manager 135 (hereinafter "cert manager" 135, each of which includes executable instructions, that when executed by processor 131, cause processor 131 to perform respective operations discussed herein and below with respect to 133-135. Medium 132 also includes one or more certificates and signed certificates held by server 110, and which are unique to the connecting device 130. Medium 132 additionally houses one or more certificates and signed certificates that are unique to other trusted connected devices of server and shared with the server 110.

As used herein, the "certificate" can be expressed and presented to an operator of validation device 120 using symbols (e.g., words, characters, tokens, etc.). The size in bits of the certificate that is translated into symbols is defined in a codec. Server 110 and connecting device 130 are preconfigured with a codec for their mutual use or connecting device 130 may supply an identifier for the selected codec (from a plurality of available codecs) during session linking between server 110 and connecting device 130. The sequence of the symbols may be referred to as a "fingerprint" of the connecting device 130 and/or a "thumbprint" of connecting device 130. The codec may form the basis for ensuring that no MITM device is present during pairing of server 110 and connecting device 130.

As used herein an "operator" may refer to an individual that operates the validation device 120. The operator of validation device 120 may visually confirm that symbols into which a fingerprint is translated, and which are presented on a display of validation device 120 include the same set of symbols as symbols presented on a display of connecting device 130 during a validation of a pairing between connecting device 130 and server 110. In example embodiments, the operator is not expected to enter any validation code into pairing validation interface 124. Rather, the validation code may be automatically generated when the operator orders the symbols through the pairing validation interface 124 to match the order of the symbols displayed on a display of the connecting device 130.

As used herein, the terms "code," "validation code," or variants thereof may be used synonymously and interchangeably. A candidate validation code is a value generated by connection manager 115 based on the candidate order of the symbols entered into pairing validation interface 123 by the operator. The code is encrypted with a public key of connecting device 130, and connection manager 115 provides the encrypted validation code to authentication manager 134. Authentication manager 134 decrypts the encrypted code and generates its own independent version of the code (as the true validation code) based on the order of the symbols presented on the display of connecting device 130. If the code independently generated by the connecting device 130 matches the decrypted version of the code supplied by connection manager 115, the authentication manager 134 sends an encrypted confirmation that the codes match to connection manager 115. This represents a technical improvement over other pairing processes because the operator does not generate/enter in a validation code; rather, the code is automatically derived from the symbol order provided by the operator. This enhances the security of the pairing process. Moreover, according to embodiments of the disclosed technology, the true validation code is not displayed on the display of the connecting device 130 and is also never provided over any network during the pairing process, further enhancing the security of technical solution disclosed herein.

In example embodiments, cert manager 113 uses a certificate root authority to obtain and store a unique server certificate that will be used as a shared secret between the server 100 and the connecting device 130. Cert manager 113 may generate a private key for use with the unique server certificate and may sign the certificate with the private key, thereby creating a unique signed server certificate for use when establishing trust with a new connecting device 130 that is attempting to pair with the server 110.

Similarly, cert manager 135 of connecting device 130 may generate a private key that is unique to the connecting device 130 and may submit a request to a certificate authority for a unique certificate to be issued to the connecting device. The connecting device 130 may save the device certificate and the private key.

In example embodiments, fingerprint word manager 133 selects a particular codec from a plurality of codecs or otherwise selects a preconfigured codec for connecting device 130. The selected codec may be identified by a corresponding codec identifier. As previously mentioned, a device's certificate may take the form of a fingerprint containing a series of pairs of hexadecimal characters. This representation may not be readily readable or conducive to memorization by an operator. As a result, operators may engage in questionable behavior, whereby they assert that they have verified the fingerprint after only inspecting one or a few of the hexadecimal pairs on the far left-hand side of the fingerprint (prefix) or the far right-hand side of the fingerprint (suffix).

Various algorithms may be employed to map a set of hexadecimal/binary characters to a codec that includes a set of symbols. For example, Bitcoin Improvement Protocol (BIP) 39 provides a technique by which a 11-bit sequence of hexadecimal/binary can be derived, hashed, and a mnemonic sequence (concatenation of entropy (ENT) and checksum (CS)) is split into 11-bit sequences, each of which is then mapped to a symbol in a given a codec. Each 11-bit sequence of hexadecimal/binary characters is transformed to the mnemonic sequence and the mnemonic sequence is mapped to a symbol in a codec having a 2 raised to the $11^{th}$ power or 2048 fixed words in the codec (dictionary). Thus, a typical 160-bit certificate fingerprint can be represented by 15 symbols (e.g., words) chosen from the codec. In this example, fingerprint word manager 133 would randomly apply a permutation on the 15 symbols (representing a connecting device secret) and provide the randomly ordered symbols to authentication manager 134. Authentication manager 134 would then display, on a display of the connecting device 130, the 15 symbols in the order generated by the fingerprint word manager 133. In example embodiments, device information for the connecting device 130 (e.g., device model and Media Access Control (MAC) address) as well as the Internet Protocol (IP) address of the connecting device 130 on the network may also be displayed. It is noted that the codecs can be based on any suitable dictionary that includes a translation/mapping from the certificate to a set of symbols and each symbol may be a character, a word, a token, or any other suitable type of indicia.

An operator, who is operating validation device 120, may utilize validation device 120 to establish a trusted connection 150 to server 110. In example embodiments, device 120 is already trusted with server 110 and is allowed to communicate with server 110 during an authenticated session between the operator and connection manager 115.

In example embodiments, the operator is in close proximity to connecting device 130 or otherwise has visual proof of what is being displayed on the display of connecting device 130 (e.g., via a camera pointed at the display), such that operator can see the displayed fingerprint/thumbprint (i.e., sequence of symbols), the connecting device's 130 information (model and MAC address), and the connecting device's 130 IP address.

In example embodiments, the operator may log into or otherwise access pairing validation interface 123 to establish a connection with connection manager 115. The operator may then enter the connecting device's IP address into the pairing validation interface 123. Responsive to this, connection manager 115 may request authentication manager 114 for initiation and linking protocols to be used to communicate with authentication manager 134 over connection 140.

It is noted that there are a variety of mechanisms by which the operator can select (e.g., via menus) or provide an identifier for connecting device 130, such that the operator may not need to supply an IP address or any other identifying information for connecting device 130. For example, server 110 may use a device discovery protocol to detect multiple devices attempting to connect to the network and display information about each such device within a menu of validation interface 123. The operator can then simply select the desired connecting device 130 via validation interface 123.

A variety of different session linking protocols or interactions can be employed between server 110 and connecting device 130. The following is an example approach for initial session linking between server 110 and connecting device 130. In an embodiment, and during session linking, authentication manager 114 may post or send a signed server certificate to authentication manager 134, and optionally, may post or send an ephemeral random secret as well (e.g., short lived nonce). In response, authentication manager 134 may reply over network 140 with the connecting device's signed certificate, codec identifier for the codec to be used (e.g., dictionary used to generate the symbol-based fingerprint being displayed on the display of connecting device 130), and optionally, the ephemeral secret. In those embodiments in which server 110 and connecting device 130 are preconfigured to use a specific codec, then no codec identifier may be sent. In example embodiments, the connecting device 130 may sign the response information with a private key of the connecting device 130 and encrypt the information using the signed server certificate received from the authentication manager 114, and send the signed, encrypted information back to authentication manager 114 over connection 140.

In an embodiment, authentication manager 114 verifies the signature, and optionally the ephemeral secret, using a public key for the connecting device 130 and a private key of server 110. Upon verification, authentication manager 114 sets the status of connecting device 130 to "linking requested" and sends a message to connection manager 115 authorizing linking/pairing of the connecting device 130 to proceed.

Connection manager 115 then displays a split thumbprint (e.g., the ordered sequence of symbols, with each symbol being display separate and independent from each other symbol—note thumbprint is different from fingerprint in that it is independent and separated symbols and not hexadecimal pairs of characters that are depicted in a fingerprint), and optionally, the connecting device's information (e.g., a MAC address, an IP address, a model number, etc.) within pairing validation interface 123 on validation device 120. An operator of the validation device 120 may then be prompted to rearrange the symbols presented on a display of device 120 into the sequence being displayed on the display of connecting device 130. It should be noted that connection manager 115 is unaware of the symbol sequence being displayed on the display of connecting device 130. Connection manager 115 does, however, have the connecting device's certificate and uses the same codec as the connecting device 130 to translate the connecting device's certificate (or other cryptographic information associated with the connecting device 130) into the same combination of symbols. Connection manager 115 uses the same codec either because the codec was preconfigured (e.g., hardcoded for both server 110 and connecting device 130) or the connecting device 130 supplied a codec identifier for the codec to the server 110 during session linking. Connection manager 115 can display, through validation interface 123, on a display of validation device 120, the set of symbols in an order defined by the connecting device's certificate (certificate order), an alphabetic order (e.g., when the symbols are words), or a random order.

In example embodiments, the order of the symbols displayed to the operator on validation device 120 is not the same as the order of the symbols presented on the display of connecting device 130. It should be noted that in various embodiments, connection manager 115 may know an original ordering of the symbols based on the certificate order but has no way of knowing the sequential ordering of the symbols displayed on the connecting device 130. In example embodiments, the operator is requested to put the symbols presented within validation interface 123 of validation device 120 into the same sequential order being presented on a display of the connecting device 130, as a challenge to the operator of validating device 120 to ensure that the operator can visually see the display of connecting device 130, and thus, that no MITM device is present on the network and trying to impersonate the connecting device 130 during the session linking.

In example embodiments, this challenge presented to the operator is not cognitively challenging and can be easily done by even individuals with somewhat diminished cognitive abilities. In particular, in example embodiments, the operator is prompted to rearrange/reorganize the split thumbprint (separated symbols) within pairing validation interface 123 to match the exact symbol sequence being shown on the display of connecting device 130 in order to establish a successful pairing of the connecting device 130 to the server 110. In some embodiments, the a configurable time limit may be specified within which the operator may be required to rearrange the symbols and submit the rearranged symbol sequence via the pairing validation interface 123. Optionally, the operator is then also asked to confirm the device information of the connecting device 130 (e.g., MAC address, model number, IP address, etc.) and approve the pairing of the connecting device 130 to the server 110 within the pairing validation interface 123.

A candidate validation code is computed from the rearranged symbol order received from the operator via the pairing validation interface 123, and connection manager 115 sets a status of "approved" for the pairing and sends a message to authentication manager 114 to link the connecting device 130 after security checks. Authentication manager 114 may then encrypt the candidate validation code, and optionally, another ephemeral secret using the public key of the connecting device 130. The encrypted validation code, and optionally, the encrypted secret may be posted or sent to authentication manager 134 of connecting device 130 over connection 140 during session linking.

Upon receipt, authentication manager 134 may decrypt the encrypted candidate validation code using the private key of connecting device 130. Authentication manager 134 may further compute an actual validation code based on the symbol sequence being displayed on the display of connecting device 130. Authentication manager 134 may then compare the candidate validation code to the actual validation code, and if they match, authentication manager 134 may reply back to authentication manager 114 confirming that the candidate validation code and the actual validation code match. In addition, the authentication manager 114 may decrypt the encrypted secret (if received from authentication manager 114), encrypt the decrypted secret with the signed certificate of the server, and send the newly encrypted secret to the authentication manager 134. In some embodiments, authentication manager 134 knows that the operator rearranged the symbols presented on the validation device 120 into the same order as the symbol sequence being presented on the display of connecting device 130 if it determines that the candidate validation code and the actual validation code match.

In an embodiment, authentication manager 134 may compute the actual validation code once the sequence of the symbols (in the true order) is presented on the display of connecting device 130, such that no additional computing of the actual validation code is needed when authentication manager 134 receives the candidate validation code from connection manager 115 during session linking. In this scenario, authentication manager 134 simply compares the provided candidate validation code against the already calculated actual validation code and determines whether there is a match or not.

In an embodiment, authentication manager 114 decrypts the secret received from authentication manager 134 and confirms that it matches what was sent, and if so, updates pairing status to "confirmed." Next, authentication manager 114 may send to authentication manager 134, the connecting device's signed certificate encrypted with the public key of the connecting device 130. In an embodiment, authentication manager 134 may decrypt the received encrypted certificate using the private key of the connecting device 130 and confirm that the decrypted certificate matches the connecting device's certificate. Authentication manager 134 may also validate that the processing flow corresponds to its selected codec. If all validation checks are successful, authentication manager 134 may respond over network connection 140 with an "okay" message to authentication manager 114, at which point, authentication manager 114 may notify connection manager 115 that pairing/linking of connecting device 130 is completed and successful, indicating that secure pairing has been established between the connecting device 130 and server 110.

Authentication manager 114 may then post or send a message over connection 140 that connecting device 130 has been securely paired and that connection 140 can now be disconnected. Authentication manager 134 may save the certificates and disconnect. In example embodiments, the next time connecting device 130 powers on and connects to the network, connection 140 is a trusted connection 150. In example embodiments, if at any point the checks fail (e.g., secret challenges, validation code, connecting device's signed certificate, etc.), the pairing of connecting device 130 to server 110 fails and must be restarted. Any such check that fails may indicate a potential for a MITM device on connection 140.

In an embodiment, the operator is remotely located from the connecting device 130 during the trust pairing. In this instance, the operator may have access to a live camera feed of the display of the connecting device 130. As another example, the operator may receive a text of an image of the display of the connecting device 130 from someone who is present at the connecting device 130 during the session linking. In some embodiments, the validation codes are time-dependent, and as such, a stale image texted to the operator will cause failure of the pairing if validity of the codes has expired. In this case, the session linking has to be restarted and the previously presented order of the symbols may be changed by connecting device 130. In some embodiments, the codec used by connecting device 130 may also change upon expiration of a validation code.

In fact, multiple levels of entropy are provided with the pairing process discussed above. In an embodiment, fingerprint word manager 133 randomly reorders the symbols displayed once the bits of the certificate are mapped to a set of symbols using the codec (and may perform the random reordering again upon expiration of a time limit). In an embodiment, fingerprint word manager 133 also randomly selects the codec from multiple available codecs (and may randomly reselect a codec at the expiration of a time limit). In some embodiments, authentication manager 114 uses ephemeral secrets or nonces when performing checks with authentication manager 134. The validation code is generated from the order provided and the total number of symbols that have to be put in order.

New device pairing to a secure network is the cornerstone on which network integrity and confidentiality for all subsequent communication with the device on the network is built. It is imperative that the process be secure so as eliminate any chance of a MITM attack on the network. In example embodiments, the process disclosed herein is cryptographically verifiable and removes any non-accountability of an operator should a MITM device be present. The operator only needs mild cognitive abilities to perform the validation since, for example, the symbols displayed are more intuitive for an operator grasp in contrast to the conventional long string of hexadecimal character pairs, which is fraught with operator error and operator shortcuts.

The technical solution disclosed herein solves a number of technical problems with conventional approaches, and as such, mitigates the risk of an MITM attack. In particular, according to embodiments of the disclosed technology, an operator is unable to authorize device pairing simply based on a time of a pairing request, because the challenge to the operator will be completely different from what was displayed initially to the operator during a different period of time. Further, the operator may have to deal with a completely different codec for the symbols for each period of time that elapses. So, the challenge changes with each time period such that the required order of the symbols is different and the symbols themselves may be different.

In an embodiment, the connecting device 130 is a transaction terminal. The transaction terminal may be a self-service terminal (SST), an automated teller machine (ATM), a point-of-sale (POS) terminal, a kiosk, a display device, an electronic payment controller, a car wash controller, a safety device, a virtual machine (VM), or a VM host computer.

In an embodiment, the connecting device 130 is a laptop, a phone, a tablet, a desktop, or a wearable processing device. In an embodiment, the connection validation client device 120 is a management transaction terminal, a laptop, a desktop, a tablet, a phone, or a wearable processing device. In an embodiment, a validated pairing request resulting in secure trusted connection 140 between server 110 and connecting device 130 is wired, wireless, or a combination of both wired and wireless. In an embodiment, the techniques are used for new connecting devices 130 being brought online by an enterprise with server 110 during initial configuration and set up of the new connecting devices 130 to ensure that secure connections 140 are free of MITM attackers. The above-noted embodiments and other embodiments are now discussed with reference to FIGS. 2-5.

Figure 2:
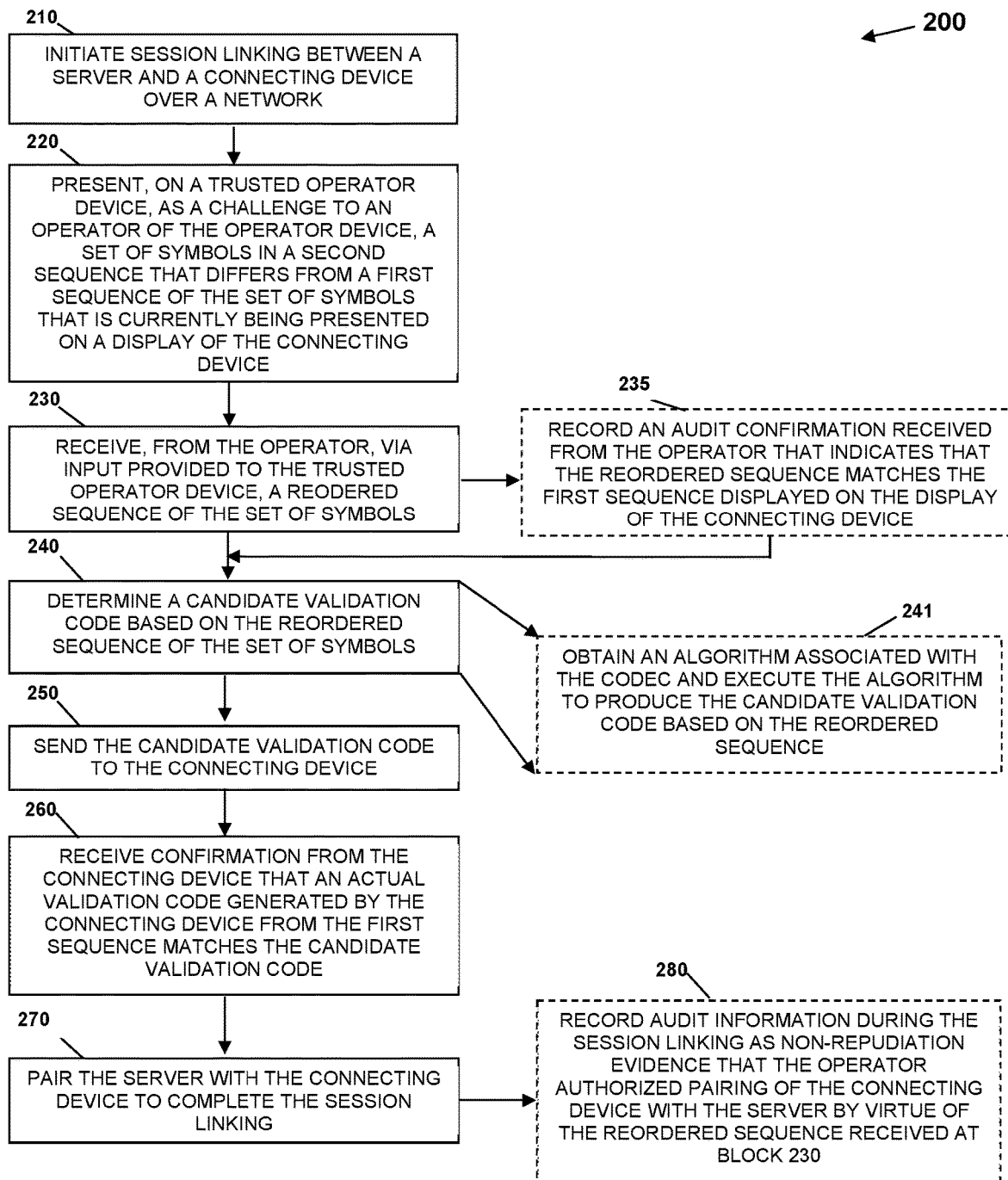
FIG. 2 is a diagram of a method of secure device pairing, according to an example embodiment.
Figure 4:
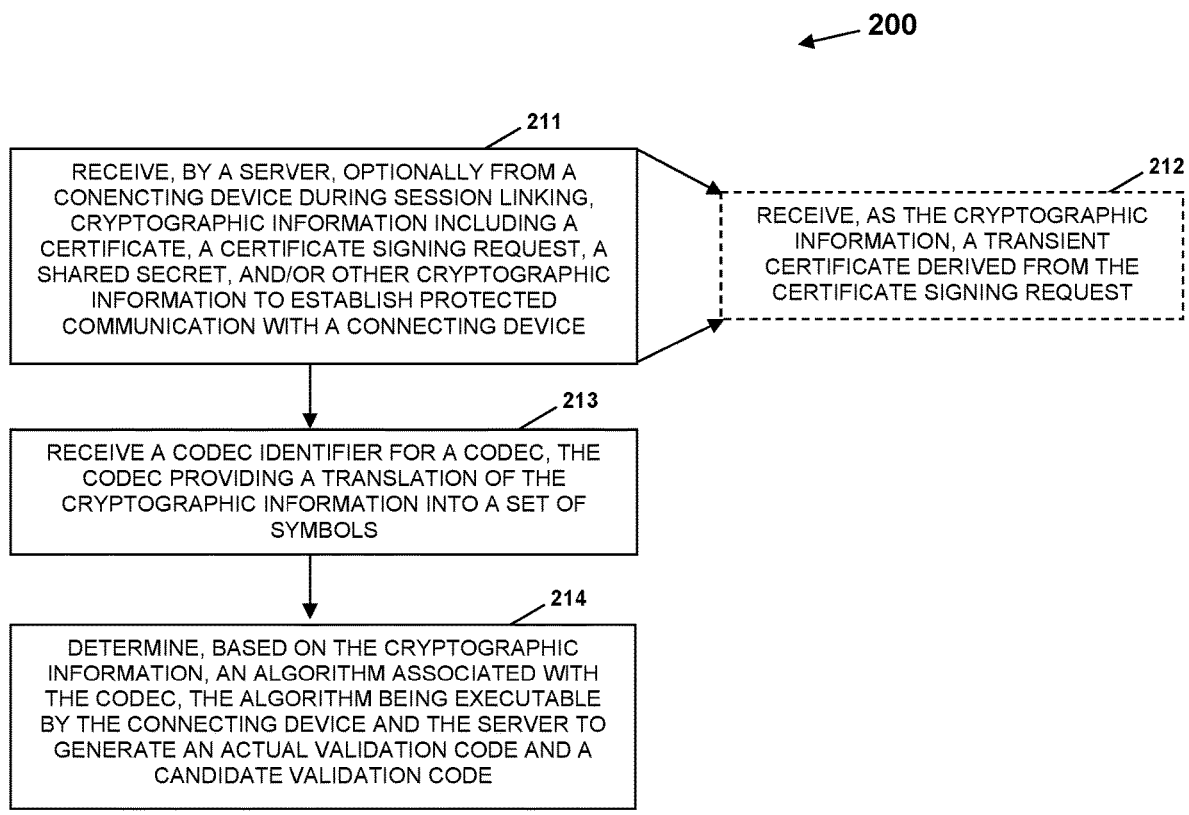
FIG. 4 is a diagram depicting additional embodiments of the method of FIG. 2.
Figure 5:
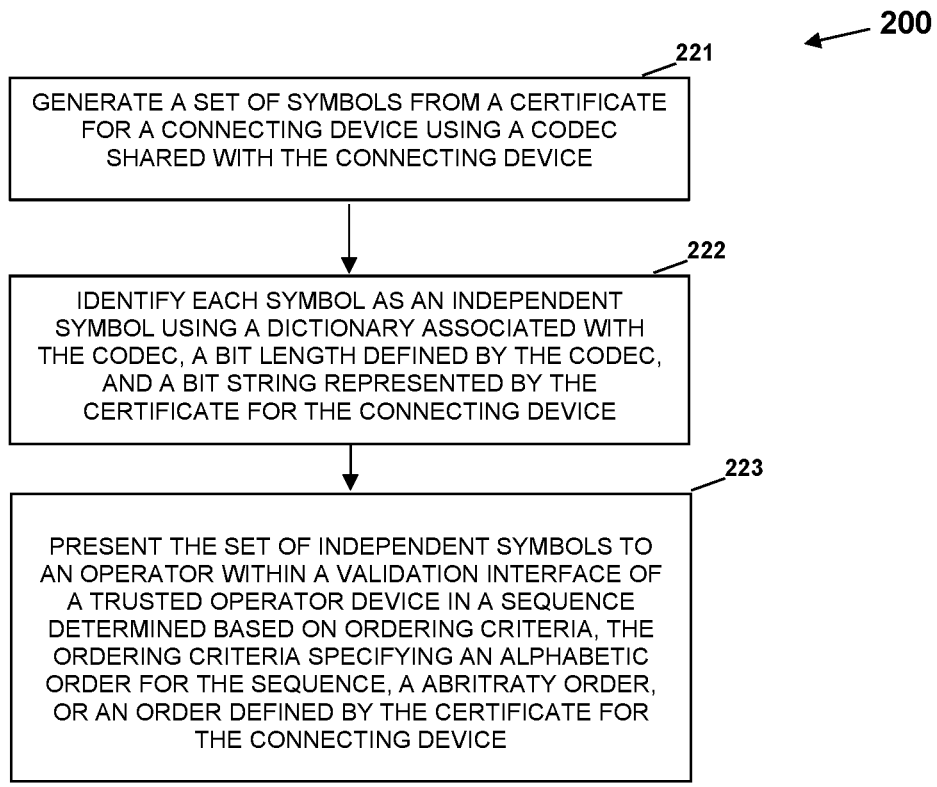
FIG. 5 is a diagram depicting further embodiments of the method of FIG. 2.

FIGS. 2, 4, and 5 are diagrams of a method 200 for secure device pairing between two devices, according to an example embodiment. The software module(s) that implements the method 200 is referred to as a "server connection pairing authenticator." The server connection pairing authenticator is implemented as executable instructions programmed and residing within memory and/or a non-transitory computer-readable (processor-readable) storage medium and executed by one or more processors of a device or set of devices. The processor(s) of the device(s) that executes the server connection pairing authenticator are specifically configured and programmed to process the server connection pairing authenticator. The server connection pairing authenticator may have access to one or more network connections during its processing. The network connections can be wired, wireless, or a combination of wired and wireless.

In an embodiment, the server connection pairing authenticator executes on server 110. In an embodiment, the server 110 is one of several servers logically presenting and cooperating as a single server representing a cloud 110 or a cloud processing environment 110. In an embodiment, the server connection pairing authenticator is one, all, or some combination of 113-115.

At 210, server connection pairing authenticator initiates session linking between server 110 and a connecting device 130 over a network. As discussed above, this can be achieved using a variety of cryptographic techniques and protocols (secure or non-secure); a specific example of session linking was provided above with the discussion of system 100.

In an embodiment, at 211 (shown in FIG. 4), the server connection pairing authenticator receives, optionally, from a connecting device 130 during session linking, cryptographic information. The cryptographic information includes a certificate, a certificate signing request, a shared secret, and/or other cryptographic information suitable to establish protected communications between server 110 and connecting device 130.

In an embodiment of 211 and at 212 (shown in FIG. 4), the server connection pairing authenticator receives, as the cryptographic information, a transient certificate derived from the certificate signing request. The transient certificate is used to protect session integrity until a permanent pairing is established between the server 110 and the connecting device 130.

In an embodiment of 211 and/or 212, at 213 (shown in FIG. 4), the server connection pairing authenticator receives a codec identifier for a codec. The codec provides a translation of the cryptographic information into a set of symbols.

In an embodiment of 211 and/or 212 and 213, at 214 (shown in FIG. 4), the server connection pairing authenticator determines, based on the cryptographic information, an algorithm associated with the codec. The algorithm executed by the connecting device 130 and server 110 to generate an actual validation code and a candidate validation code.

At 220, the server connection pairing authenticator presents, on a trusted operator device, as a challenge to an operator of the operator device 120 a set of symbols. The set of symbols differs from a first sequence of the set of symbols that is currently being presented on a display of the connecting device 130. That is, the set of symbols presented on the trusted operator device 120 is disordered from an original presented sequence of the symbols that are currently being displayed on connecting device 130.

In an embodiment, at 221 (shown in FIG. 5), the server connection pairing authenticator generates the set of symbols from a certificate for a connecting device 130 using a codec shared with connecting device 130. The set of symbols generated by the server connection pairing authenticator is the same set of symbols generated by the connecting device 130. The server connection pairing authenticator knows the certificate of the connecting device, such that the server connection pairing authenticator can provide an order for the set of symbols in a certificate defined order, an alphabetic order or a random order.

In an embodiment of 221 and at 222 (shown in FIG. 5), the server connection pairing authenticator identifies each symbol as an independent symbol using a dictionary associated with the codec, a bit length defined in the codec (for each symbol), and bit string represented by the connecting device certificate for the connecting device 130.

In an embodiment of 221 and/or 222, at 223 (shown in FIG. 5), the server connection pairing authenticator presents the set of independent symbols to the operator within a validation interface 123 of trusted operator device 120 based on ordering criteria. The ordering criteria specifying an alphabetic order, a random order, or a certificate order defined by the connecting device certificate for the connecting device 130. Server connection pairing authenticator does not know the true order of the symbols being presented on the connecting device 130 but does know the certificate order of the symbols from the connecting device's certificate exchanged during session linking. From the certificate order, the server connection pairing authenticator can used ordering criteria to elect a variety of orders to present the symbols to the operator on an operator-operated device display.

At 230, the server connection pairing authenticator receives, from the operator, via input provided to the trusted operator device 120, a reordered sequence of the set of symbols. The reordered sequence for the set of symbols is believed by the operator to match the original sequence of the symbols being presented on the display of connecting device 130.

In an embodiment, at 235, the server connection pairing authenticator records an audit confirmation from the operator that the reordered sequence matches the first sequence displayed on the display of the connecting device 130. The operator acknowledges that the symbols presented in the original sequence on the display of connecting device 130 matches the symbols presented in the different order on operator device 120 to the operator.

At 240, the server connection pairing authenticator determines a candidate validation code based on the reordered sequence of the set of symbols provided at 230. The server connection pairing authenticator calculates a candidate validation code for connecting device 130 from the reordered sequence of the set of symbols entered by the operator via operator device 120.

In an embodiment, at 241, the server connection pairing authenticator obtains an algorithm associated with the codec and executes the algorithm to produce the candidate validation code based on the reordered sequence. This can be an OTP and/or a TOTP algorithm based on the order for the words, symbols, or tokens in the reordered sequence.

At 250, the server connection pairing authenticator sends the candidate validation code to the connecting device 130. The connecting device will use the candidate validation code to compare against an actual validation code that is calculated by the connecting device 130 from the first sequence of the set of symbols that the connecting device is presenting on its display.

At 260, the server connection pairing authenticator receives confirmation from the connecting device 130 that an actual validation code generated by the connecting device 130 from the first sequence (presented sequence on the display of the connecting device 130) matches the candidate validation code. Pairing is authorized if the connecting device 130 confirms the candidate validation code matches the actual validation code.

At 270, the server connection pairing authenticator pairs the server with the connecting device 130 to complete the session linking. The connecting device 130 is now trusted to engage with the server in subsequent sessions after the initial pairing is completed during the session linking.

In an embodiment, at 280, the server connection pairing authenticator records audit information during the session linking as non-repudiation evidence that the operator authorized the pairing of the connecting device 130 with the server by virtue of the reordered sequence received at 230. Since the server connection pairing authenticator is unaware of the presented sequence of the set of symbols displayed on the connecting device 130 and is only aware of the order of the symbols that comport directly with the order of the certificate, the server connection pairing authenticator can present any order to the operator as part of the challenge (220). If the calculated candidate validation code (based on the entered reordered sequence provided by the operator at 230) matches the actual validation code generated by the connecting device 130, the operator cannot deny that the operator authorized the pairing, since even the server connection pairing authenticator is unaware of the presented order of the symbols on the display of the connecting device 130.

Figure 3:
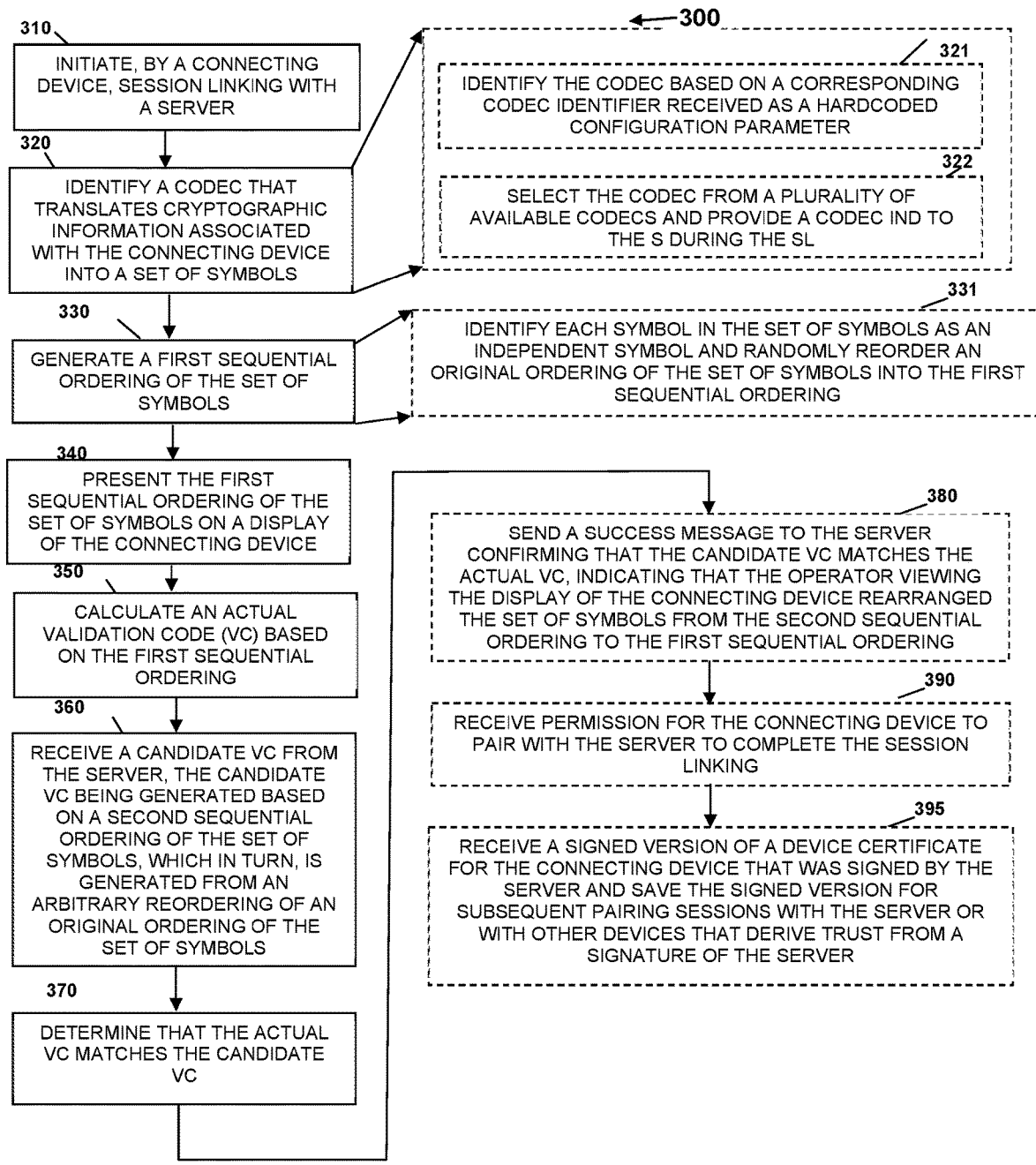
FIG. 3 is a diagram of another method of secure device pairing, according to an example embodiment.

FIG. 3 is a diagram of a method 300 for secure device pairing between two devices, according to an example embodiment. The software module(s) that implements the method 300 is referred to as a "connecting device pairing manager." The connecting device pairing manager is implemented as executable instructions programmed and residing within memory and/or a non-transitory computer-readable (processor-readable) storage medium and executed by one or more processors of a device or set of devices. The processor(s) of the device that executes the connecting device pairing manager are specifically configured and programmed to process the connecting device pairing manager. The connecting device pairing manager may have access to one or more network connections during its processing. The network connections can be wired, wireless, or a combination of wired and wireless.

In an embodiment, the device that executes the connecting device pairing manager is connecting device 130. In an embodiment, device 130 is an ATM, an SST, a POS terminal, a kiosk, a laptop, a desktop, a phone, or a wearable processing device. In an embodiment, the connecting device pairing manager is all of, or some combination of, 133-135. The connecting device pairing manager interacts with server 110 in the manners discussed above with system 100 and/or interacts with method 200 of FIG. 2 for purposes of validating and authorizing a connecting device 130 to connection/pair with server 110.

At 310, connecting device pairing manager initiates session linking with a server 110. The operator starts the session linking through operator device 120 using interface 125 to select connecting device 130. This causes server 110 to engage connecting device pairing manager of connecting device 130 for initiation of the session linking.

At 320, the connecting device pairing manager identifies a codec that translates, transforms, or converts parts (bits of a predefined length) of cryptographic information associated with the connecting device 130 into a set of symbols. The codec defines a length in bits of the cryptographic information for each independent symbol and provides the translation or transforms to the corresponding symbol based on the bit values for the corresponding bit string of the predefined length.

In an embodiment, at 321, the connecting device pairing manager identifies the codec based on a corresponding codec identifier received as a hardcoded configuration parameter. Here, even though the codec is hardcoded there may be a plurality of codecs such that the connecting device pairing manager utilizes a hash or an algorithm that changes the selected codec during each period of time (the period of time may be predefined or the time period itself may vary may such that time is a factor in determining particular codecs).

In an embodiment, at 322, the connecting device pairing manager selects the codec from a plurality of available codecs and provides the codec identifier to server 110 during the session linking. Selection of the codec can be based on a variety of factors, such as localization, security/usability tradeoffs, accessibility (for operators with disabilities), current time period being used, and/or versioning (rolling out codec improvements).

At 330, the connecting device pairing manager generates a first sequential ordering of the set of symbols. That is, the connecting device pairing manager changes the order of the symbols defined by the certificate (original order) of the connecting device 130 into the first sequential ordering.

In an embodiment, at 331, the connecting device pairing manager identifies each symbol and randomly reorders an original ordering (certificate defined ordering) of the set of symbols into the first sequential ordering. So, connecting device pairing manager randomly reorders the original ordering (such as a certificate ordering) of the symbols into the first sequential ordering.

At 340, the connecting device pairing manager presents the first sequential ordering of the set of symbols on a display of the connecting device 130. This first sequential ordering is not communicated over any network wire and is not transmitted to any device, it remains a secret to the connecting device 130 discoverable only when viewing the display of the connecting device.

At 350, the connecting device pairing manager calculates an actual validation code based on the first sequential ordering. This can be based on a time, such that the entropy increases with time and the connecting device pairing manager will calculate different actual validation codes for the first sequential ordering during different periods of elapsed time.

At 360, the connecting device pairing manager receives a candidate validation code from server 110. The candidate validation code was generated based on the second sequential ordering of the set of symbols, which is created (by the operator) from an arbitrary reordering of an original ordering (certificate defined ordering) of the set of symbols.

At 370, the connecting device pairing manager determines that the actual validation code matches the candidate validation code. This means that the operator provided the second sequential ordering to the server to match the first sequential ordering presented on the display at 340 by the connecting device pairing manager. This facilitates completion of pairing from the perspective of the connecting device 130, there other optional steps that may occur as well listed as embodiments below.

In an embodiment, at 380, the connecting device pairing manager sends a success message to server 110 confirming that the candidate validation code matches the actual validation code. This is an indication to the server that the operator viewing the display of the connecting device 130 rearranged the set of symbols from the second sequential ordering to the first sequential ordering.

In an embodiment of 380 and at 390, The connecting device pairing manager receives permission for the connecting device 130 to pair with the server to complete the session linking. At this point in time, the connecting device 130 is a trusted device that is henceforth permitted to establish a trusted connection with the server 110 over the network with no MITM device present.

In an embodiment, at 395, the connecting device pairing manager receives a signed version of a device certificate for the connection device 130 that was signed by the server 110. The connecting device pairing manager saves the signed version for subsequent pairing sessions with server 110 or with other devices that derive trust from a signature of the server 110.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   initiating session linking between a server and a connecting device over a network;
   presenting, on a trusted operator device, as a challenge to an operator of the trusted operator device, a set of symbols in a second sequence that differs from a first sequence of the set of symbols that is currently being presented on a display of the connecting device;
   receiving, from the operator, via input provided to the trusted operator device, a reordered sequence of the set of symbols;
   determining a candidate validation code based on the reordered sequence of the set of symbols;
   sending the candidate validation code to the connecting device;
   receiving confirmation from the connecting device that an actual validation code generated by the connecting device from the first sequence of the set of symbols matches the candidate validation code; and
   pairing the server with the connecting device to complete the session linking.

2. The method of claim 1, wherein initiating further includes receiving a certificate, a certificate signing request, a shared secret, or other cryptographic information suitable to establish protected communication between the server and the connecting device.

3. The method of claim 2, wherein receiving the certificate, the connecting device certificate, the certificate signing request, the shared secret, or the other cryptographic information further includes receiving a codec identifier for a codec providing a translation of the cryptographic information into a set of symbols.

4. The method of claim 3, wherein receiving the codec identifier further includes receiving the codec identifier from the connecting device during the session linking.

5. The method of claim 2, wherein initiating the session linking further includes receiving, as the cryptographic information, a transient certificate derived from the certificate signing request.

6. The method of claim 1, wherein presenting further includes generating the set of symbols from a certificate for the connecting device using a codec shared with the connecting device.

7. The method of claim 6, wherein determining further includes identifying each symbol as an independent symbol using a dictionary associated with the codec, a bit length defined by the codec, and a bit string represented by the certificate for the connecting device.

8. The method of claim 7, wherein determining further includes presenting the set of the independent symbols to the operator within a validation interface of the trusted operator device in a sequence determined based on ordering criteria specifying an alphabetic order, a random order, or an order defined by the certificate for the connecting device certificate.

9. The method of claim 1, wherein determining further includes obtaining an algorithm associated with a codec and execute the algorithm to produce the candidate validation code based on the reordered sequence.

10. The method of claim 1, wherein receiving the reordered sequence further includes recording an audit confirmation from the operator that indicates the reordered sequence matches the first sequence displayed on the display of the connecting device.

11. The method of claim 1 further comprising, recording audit information during the session linking as non-repudiation evidence that the operator authorized pairing of the connecting device with the server by virtue of the reordered sequence received from the operator.

12. A method, comprising:
 initiating, at a connecting device, session linking to pair the connecting device with a server;
 identifying a codec that translates parts of cryptographic information associated with the connecting device into a set of symbols;
 generating a first sequential ordering of the set of symbols;
 presenting the first sequential ordering of the set of symbols on a display of the connecting device;
 calculating an actual validation code based on the first sequential ordering;
 receiving a candidate validation code from the server, the candidate validation code being generated based on the second sequential ordering of the set of symbols, which is created from an arbitrary reordering of an original ordering of the set of symbols; and
 determining that the actual validation code matches the candidate validation code to facilitate completion of pairing with the server.

13. The method of claim 12, wherein identifying further includes identifying the codec based on a corresponding codec identifier obtained as a hardcoded configuration parameter.

14. The method of claim 12, wherein identifying further includes selecting the codec from a plurality of available codecs and providing a codec identifier for the codec to the server during the session linking.

15. The method of claim 12, wherein generating further includes identifying each symbol in the set of symbols as an independent symbol and randomly reorder an original ordering of the set of symbols into the first sequential ordering.

16. The method of claim 15, wherein identifying each symbol further includes executing a time-based random algorithm to produce the random reorder for the first sequential ordering from the original ordering.

17. The method of claim 12 further comprising:
 sending a success message to the server confirming that the candidate validation code matches the actual validation code, indicating that the operator viewing the display of the connecting device rearranged the set of symbols from the second sequential ordering to the first sequential ordering; and receiving a permission for the connecting device to pair with the server to complete the session linking.

18. The method of claim 17, wherein replying further includes receiving a signed version of a certificate for the connecting device that was signed by the server and saving the signed version for subsequent pairing sessions with the server or with other devices that derive trust from a signature of the server.

19. A system, comprising:
 a server comprising at least one processor and a non-transitory computer-readable storage medium;
 the non-transitory computer-readable storage medium comprises server executable instructions;
 the server executable instructions when executed by the at least one processor from the non-transitory computer-readable storage medium cause the at least one processor to perform operations comprising:
  initiating session linking between the server and a connecting device;
  identifying a codec used by the connecting device;
  splitting parts of a cryptographic information shared with the connecting device into independent symbols;
  presenting the symbols within a validation interface of an operator device being operated by an operator during the session linking, wherein the independent symbols are presented within the validation interface in an arbitrary ordering that is different from a first sequential ordering being presented on a display of the connecting device to the operator, and wherein the server is unaware of the first sequential ordering;
  receiving a second sequential ordering of the symbols, wherein the operator reorders the arbitrary ordering into the second sequential ordering;
  generating a candidate validation code from the second sequential ordering;
  sending the candidate validation code to the connecting device; and
  pairing the connecting device to the server to complete the session linking when the connecting device confirms the second sequential ordering matches the first sequential ordering based on the candidate validation code matching an actual validation code generated by the connecting device.

20. The system of claim 19, wherein the connecting device is an automated teller machine (ATM), a self-service terminal (SST), a point-of-sale (POS) terminal, a fueling station forecourt controller, a kitchen controller, a security device, a safe, a display device, an electronic payment controller, a car wash controller, a safety device, a virtual machine, a virtual machine host computer, a kiosk, a tablet, a laptop, a phone, or a wearable processing device.

* * * * *